United States Patent [19]

Formica et al.

[11] 3,875,553
[45] Apr. 1, 1975

[54] DIRECTIONAL DETECTION SYSTEM

[75] Inventors: Vincent A. Formica, Holland; Steve F. Torok, Southampton; Jasper Caro, Levittown, all of Pa.

[73] Assignee: The United States of America as represented by the Secretary of the Navy, Washington, D.C.

[22] Filed: Dec. 27, 1971

[21] Appl. No.: 212,809

[52] U.S. Cl. .............................. 340/16 R, 340/6 R
[51] Int. Cl. ............................................. G01s 3/80
[58] Field of Search ............... 340/2, 6 R, 16 R; 343/113 R

[56] References Cited
UNITED STATES PATENTS

| | | | |
|---|---|---|---|
| 3,148,351 | 9/1964 | Bartlett | 340/16 R |
| 3,176,262 | 3/1965 | Ehrlich et al. | 340/6 R |

*Primary Examiner*—Richard A. Farley
*Attorney, Agent, or Firm*—R. S. Sciascia; Henry Hansen

[57] ABSTRACT

A directional detection system including a microphone assembly comprising an omnidirectional microphone and two orthogonal directional microphones. The omnidirectional microphone signal is connected to a phase lock loop comprising a sweep generator connected to drive a voltage controlled oscillator where the output signal of the oscillator is compared in a phase detector with the microphone signal. Upon registering a match and satisfying a predetermined signal-to-noise ratio the phase lock loop locks on to one spectral component of the microphone signal, the sweep is terminated and the loop tracks the signal by integrating the phase detector output signal and further controlling the oscillator therewith. The integrated detector output signal, or the loop error signal, is connected to an enable unit which produces an enable signal when the error signal is within a predetermined frequency band and exceeds a predetermined amplitude. The enable signal is connected to a plurality of narrow bandpass tracking filters set to pass a frequency determined by the oscillator, the filters being respectively connected to receive the omnidirectional and the directional microphone signals. The enable signal activates each tracking filter and the respective output signals thereof are connected to a frequency converter which converts the signals into respective sidebands. The sidebands are then compared in phase, generating an azimuth signal referenced against magnetic north.

10 Claims, 2 Drawing Figures

DIRECTIONAL DETECTION SYSTEM

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates to acoustic sensors, and more particularly to acoustic sensors capable of locking onto discrete spectral components of acoustic signals radiated by land vehicle power plants.

The necessity for covert detection of land vehicles or trucks is often encountered in military operations. Generally such covert detection has to be made in the presence of enemy personnel which precludes the use of large sized detection systems or limits the use of detection systems requiring large numbers of sensors. Furthermore, the deployment of such sensors requires supporting equipment or, depending on detector range, emplacement by foot patrols and, due to the expense of the equipment, must be done in the immediate anticipated vicinity of future troop movement. Accordingly, the emplacement must be performed a short time prior to the tactical movement. Such requirements place a heavy burden on the deploying personnel and furthermore produce signatures which are visible to the patrols usually preceding a troop column, providing an easy means of discovering the sensors and their destruction. Typically the prior art systems were generally of the omnidirectional type, necessitating a large number of sensors to provide bearing information or to determine the total number of trucks in an area, and furthermore characteristically the omnidirectional feature of the sensor is inherently susceptible to a high false alarm rate since no discrimination is possible according to azimuth. In addition the prior art systems typically failed to discriminate between land vehicles and low flying aircraft, further confusing with false registry the primary objective of detecting land vehicles or trucks. Typically the characteristic noise emanated by a land vehicle is composed of a fundamental and harmonics generally emitted by an internal combustion engine, all contained within a predictable bandpass, where the individual spectra are perturbed in time as a function of the rolling frequency of the vehicle, and oscillations in rate caused by perturbation in the road surface. Accordingly, the spectral breakdown of the acoustic signal is characteristically composed of strong fundamental and harmonic components which oscillate within a predictable frequency band, providing a distinguishing feature for discrimination.

SUMMARY OF THE INVENTION

Accordingly, it is a general purpose and object of the present invention to provide an acoustic detector which locks onto a spectral component of a broadband signal oscillating in a predictable bandpass, producing a phase angle signal indicative of the direction of propagation of the spectral component. Other objects of the invention are to reduce the background noise effect by selectively detecting narrow bandpass components of a signal and to provide directional information based on the respective phase angles of signals received by directional sensors.

Briefly these and other objects are accomplished in the present invention by providing a microphone assembly including two orthogonal directional microphones and an omnidirectional microphone having a circular lobe pattern. The omnidirectional microphone output is attenuated by a bandpass filter selected to pass the typical frequency spectrum of a land vehicle and the output of the bandpass filter is fed to an active narrow band tracking filter centered to pass a frequency band determined by a variable oscillator or clock signal. The tracking filter is enabled or activated by an enable signal and in the absence of such signal does not attenuate. A phase lock loop receives the output of the tracking filter, producing a feedback signal to a voltage controlled oscillator looped back to produce a minimal phase difference between the loop input signal and the oscillator or clock signal. The oscillator further receives a signal output of a sweep generator which is controlled to maintain sweep as long as the signal-to-noise ratio of the phase lock loop is below a predetermined level. Upon reaching a predetermined signal-to-noise ratio the sweep is discontinued and the loop error signal, now locked onto one frequency spectrum is inspected for the characteristic fluctuations of a land vehicle, determined by a second bandpass filter and a threshold unit forming an enable unit. Upon receiving an error signal of a predetermined frequency and, above a threshold level the enable unit produces the enable signal activating the tracking filter. In addition three other tracking filters are activated by the enable signal, each respectively connected to receive the omnidirectional and the directional microphone signals, where the output of these filters is fed to a frequency converter to break down the respective signals into sidebands and the respective sidebands are compared in phase detectors to produce an azimuth readout of the land vehicle.

DESCRIPTION OF THE PREFERRED EMBODIMENT

Figure 1:
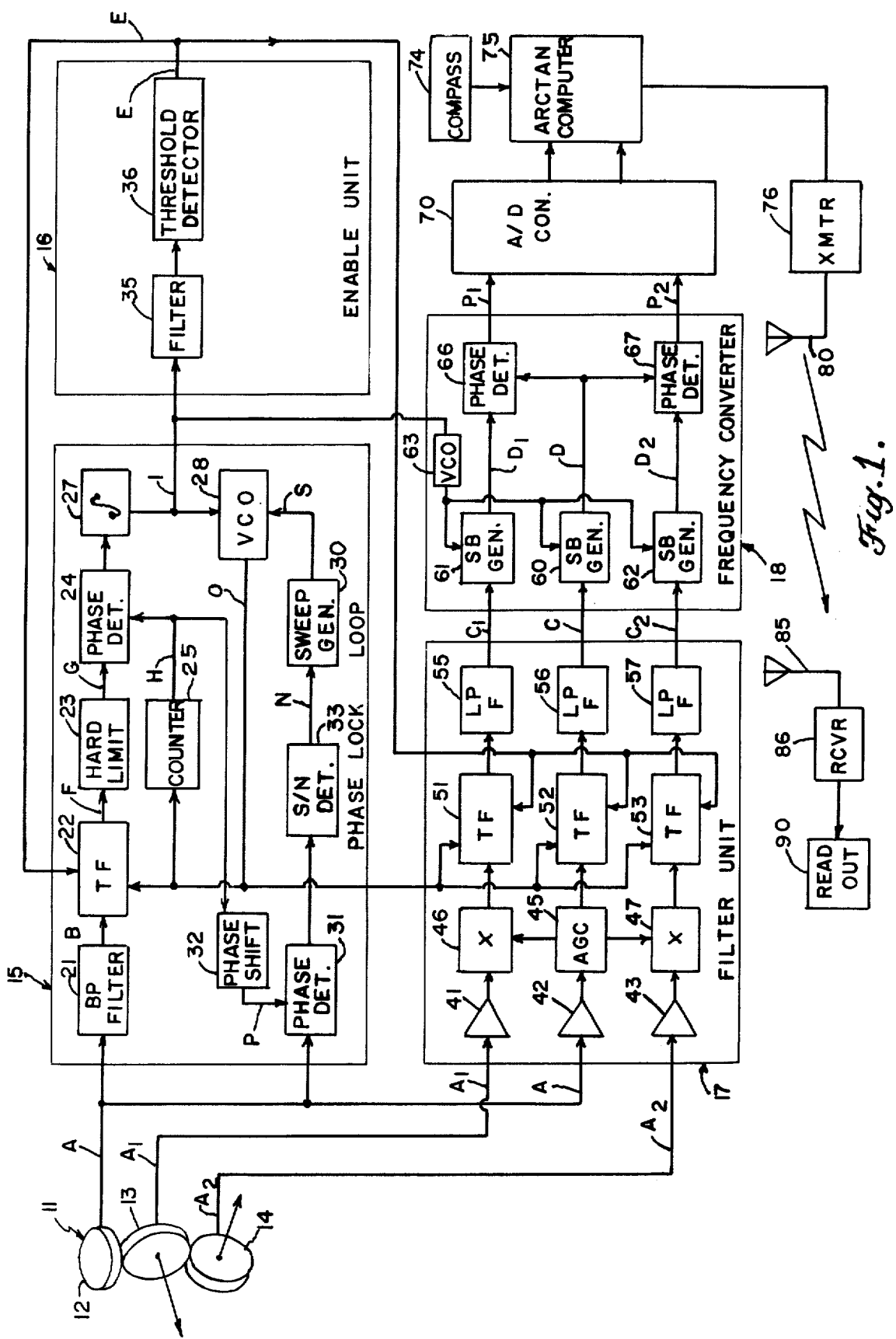
FIG. 1 is a block diagram of a directional detection system constructed according to the present invention.

As shown in FIG. 1 a microphone assembly 11 comprises an omnidirectional microphone 12 having a planar lobe pattern characteristic of a toroid, omnidirectional in the horizontal plane, which is aligned substantially with the ground surface for receiving the acoustic signals generated by land vehicles. Adjacent to microphone 12 are two directional microphones 13 and 14, also of a conventional type, having their axes aligned along two orthogonal vectors in a plane parallel to the ground surface. Microphones 12, 13 and 14 respectively produce signals A, $A_1$ and $A_2$ corresponding to the acoustic noise received thereat. The omnidirectional signal A is connected to a conventional bandpass filter 21 set to pass a frequency spectrum between 50 and 150 Hz, for example, these being substantially the frequency limits of the acoustic noise generated by an internal combustion engine. An output signal B of filter 21 is passed to an active narrow bandpass tracking filter 22, which can be a conventional digital filter, the center frequency of the filter being determined by a clock signal O included by a bandpass of approximately 10 Hz. Filter 22 is configured to attenuate only upon receiving an enabling signal E, where signals O and E are produced by sources further described below. At the output filter 22 generates a signal F which can be either an exact replica of signal B in the absence of signal E or a narrow spectrum of signal B centered at the frequency set by signal O when enabled. Signal F is fed to a conventional hard limiter 23 being converted to a square wave signal G according to well-known techniques in the art. Signal G connects to a phase detector which also receives a signal H from a counter 25 which at the input thereof receives clock signal O, in effect dropping or dividing the clock frequency to a lower frequency as determined by the length of the count therein. The output of phase detector 24 is connected to a conventional integrator 27 which accumulates the phase differences and produces an error signal I to a conventional voltage controlled oscillator 28 which also receives a sweep generator signal S from a sweep generator 30. The output of voltage controlled oscillator 28 comprises an oscillating signal or the clock signal O of a frequency dependent on the combination of signal I and signal S.

Signal A is also connected to a conventional detection unit 31 which also receives a signal P from a phase shifter 32 which phase shifts by 90° counter signal H. The output of detection unit 31 is the phase difference between signal P and signal A which typically is maximum when the output of phase detector 24 is approximately zero. In this manner a signal is produced connected to a signal-to-noise detector 33, which by conventional means produces a signal N to sweep generator 30 at all times when the signal-to-noise ratio in detector 33 is below a predetermined level. Accordingly, sweep generator 30 will continue to sweep as long as the signal-to-noise detector 33 is below a predetermined signal-to-noise ratio, or as long as signal N is on and the generated sweep signal S continues to change the frequency of voltage controlled oscillator 28 producing a series of oscillating signals varying in frequency. The voltage controlled oscillator 28 operates at a frequency gain factor greater then one in order to match the cycles to the frequency ratio of tracking filter 22. Counter 25 divides the signal O frequency to a lower rate, corresponding to the tracking filter 22 rate, in effect reducing the loop gain of the phase lock loop to a gain of one. This feature permits a relatively quick search or sweep through a wide range of frequencies which upon reaching a match of favorable signal-to-noise ratio permits some variations in the received spectrum to pass as an error signal and also accommodates the requirements of the tracking filter. Upon a match in phase detector 24 and a signal-to-noise ratio exceeding the threshold set by detector 33 the voltage controlled oscillator 28 is limited to track the excursions in signal I, the sweep generator signal S is discontinued, and the phase lock loop 12 is locked onto a dominant frequency spectrum passed by hard limiter 23 forming effectively a narrow bandpass filter, the bandpass being determined by the inverse of the gain of integrator 27. Specifically the phase lock loop locks onto one dominant frequency spectrum and tracks that frequency spectrum to within the error signal or signal I out of integrator 27. Signal I indicates the instantaneous tracking error, thereby providing an indication of the rate of change of one spectrum of the input signal A.

Signal I from integrator 27 is fed to an enable unit 16 to the input side of a filter 35 having a bandpass of approximately 0.15 to 0.35 Hz. The output of filter 35 is fed to an amplitude or threshold detector 36 having a predetermined threshold and producing output signal E when the threshold is exceeded. The function of filter 35 is to detect the oscillations about a mean value of the spectral line locked in by the phase lock loop 12 which are typical in land vehicles, these being typically due to a relatively low state of tuning of the power plant and the various motions of the vehicle itself transmitted to the power plant which result in changes of its speed. By measurement it has been observed that these changes typically occur in a frequency bandpass of approximately 0.15 to 0.35 c.p.s. and therefore serve to easily distinguish a land vehicle from an aircraft or any other acoustic source.

The output signal E from decision unit 16 is fed back to the phase lock loop 15 where it is connected to tracking filter 22, enabling the tracking filter when the conditions of the decision unit are met. Furthermore, the same signal E is connected to a filter unit 17 which is also connected to receive signals A, $A_1$ and $A_2$, respectively, from microphone assembly 11. Filter unit 17 includes preamplifiers 41, 42 and 43 respectively receiving signals $A_1$, A and $A_2$. The output of preamplifier 42 is fed to an automatic gain control 45 which, by conventional means, maintains a level signal output and which also slaves two multipliers or gain control units 46 and 47, respectively leveling the output signals of the preamplifiers 41 and 43. The respective outputs of gain control units 45, 46 and 47 are connected to digital tracking filters 51, 52 and 53 which, similar to filter 22, are controlled by clock signal O to pass the frequency spectrum locked in the phase lock loop 12 and which are enabled by signal E from enable unit 16. The output of each narrow bandpass tracking filter 51, 52 and 53 forms a signal $C_1$, C and $C_2$, in respective low-pass filter 55, 56 and 57 respectively passing one discrete spectrum of the signals $A_1$, A and $A_2$ and forming the output signals of filter unit 17. Signals $C_1$, C and $C_2$ are respectively connected to a frequency converter 18 at the input sides of conventional sideband generators 60, 61 and 62. Generators 61, 60 and 62 also receive an output signal from a voltage controlled oscillator 63. Generators 61, 60 and 62 provide full-wave balanced multiplication, as for example for a sinusoidal output signal C from low-pass filter 56 sideband generator 60 will contain an internal signal product, or signal.

$$D^1 = K[\cos(\omega_o + \omega_s)t + \cos(\omega_o - \omega_s)t] \quad (1)$$

where $K$ is a constant coefficient, $\omega_o$ is the frequency of oscillator 63 and $\omega_s$ is the frequency of signal $C$. In this case the two sideband signals are $$SB = \omega_o \pm \omega_s \quad (2)$$

The two sideband signals are then separated by conventional filters, or if the sideband separation is small by a narrow band digital filter which, for example, passes the lower sideband $\omega_o - \omega_s$ attenuating the $\omega_o + \omega_s$ sideband and thus producing signal D. Oscillator 63 is controlled by signal I of phase lock loop 15 providing varying frequency signal $\omega_o$ equal to a fixed carrier frequency plus the frequency of signal F.

Accordingly, the respective frequency converter signals D, $D_1$ and $D_2$ represent the lower sidebands of corresponding signals $C_1$, C and $C_2$ corresonding to the omnidirectional and to the directional microphone signals. This signal remains at a constant frequency regardless of the frequency of the incoming signal. Signal D is commonly fed to a sine phase detector and a cosine phase detector 66 and 67 which respectively also receive signals $D_1$ and $D_2$ producing phase difference signals $P_1$ and $P_2$ between the sideband of the omnidirectional signal and the respective directional signal sidebands. Signals $P_1$ and $P_2$ are converted to digital code in a conventional analog-to-digital converter 70 which produces digital output signals connected to a conventional arctan computer 75, which also receives a reference magnetic compass signal, producing a digital signal corresponding to the angle of the tangent equal to the division $$\text{angle } \alpha = \tan^{-1} P_1/P_2 = \tan\left[^{-1} K\sin(\omega_o - \omega_s)t / K\cos(\omega_o - \omega_s)t\right]$$

(3)

where $\alpha$ is the azimuth of the location of the land vehicle relative the magnetic north.

Figure 2:
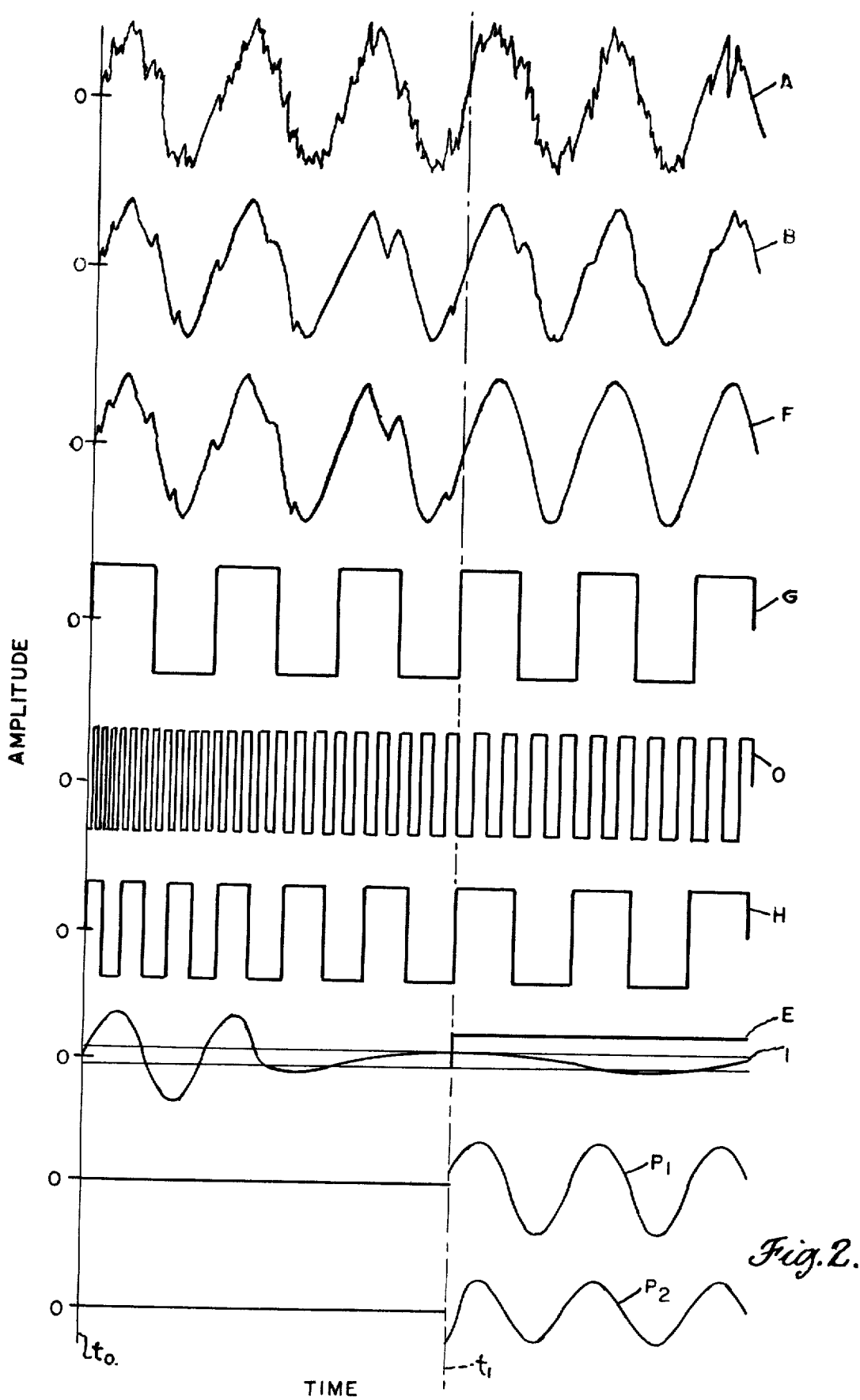
FIG. 2 is a typical amplitude versus time illustration of various signals of FIG. 1.

The operation of the present invention will now be described with reference to FIG. 2. Signal A generated by microphone 12, comprises a broad spectrum of acoustic signals, including one dominant spectrum exaggerated for purposes of illustration, representing the acoustic spectrum generated by a land vehicle containing one dominant frequency together with the random background noise of the environment. Signal B, generated by the bandpass filter 21, includes the vehicle signal with the high frequency components of the background noise attenuated, being received by the tracking filter 22 which is inactive between time $t_0$ and time $t_1$. Accordingly the output signal F of tracking filter 22 is an exact replica of signal B over the time interval $t_1$ to $t_2$. Signal F is connected to hard limiter 23 producing at the output thereof a square wave pulse signal G in phase with the changes in polarity of signal F. Signal G is compared in phase with counter signal H in phase detector 24 and the phase difference output thereof is integrated to from signal I which controls oscillator 28.

Oscillator 28 produces a series of pulses signal O of varying frequency or length functionally dependent on the signal sum of signals I and S, which is connected to tracking filters 22, 51, 52 and 53 forming a digital replica of the center frequency thereof. Specifically in this embodiment the tracking filters include digital converters forming one sinusoidal cycle for each four pulses of signal O, however the number of pulses may be greater for a better reproduction of a sine wave. Similarly counter 25 reduces or divides signal O by the same count of four thereby producing a square wave of a length equal to the square wave signal G generated by limiter 23.

In a similar manner phase detector 31 compares signal H phase shifted by 90° with the raw or unfiltered signal A in order to provide a maximum phase difference. Signal H is varied by sweep generator 30 and the phase difference thereof is continuously inspected in signal-to-noise detector 33 for a spectrum having a high signal-to-noise ratio. The sweep is discontinued at a time when the signal-to-noise ratio exceeds a predetermined level which in this illustration occurs immediately prior to $t_1$ due to the relative strength of the dominant component of signal A. At this point the phase lock loop is locked onto a spectrum and the oscillations of signal I after $t_1$ are primarily due to the periodic variations of signal A characteristic of land vehicles, registered as a rate error of the phase lock loop. Filter 35 is selected to pass frequencies of this order to detector 36 which generates signal E. Signal E enables tracking filters 51, 52 and 53 allowing for the discrimination of the sidebands in frequency converter 18 which produces a sine and cosine signal $P_1$ and $P_2$ the amplitudes thereof providing respective inputs to arctan computer 75, generating an azimuth angle which is transmitted by transmitter 76 to a receiver 86 to register on readout 90.

Some of the many advantages of the present invention should now be readily apparent. The invention provides means for discrimination between acoustic source according to the characteristic instability patterns thereof. Furthermore, the invention can be adapted to discriminate sources other than land vehicles. This the invention can accomplish in the presence of relatively high background noise and with minimum amount of equipment.

Obviously many modifications and variations of the present invention are possible in view of the above teachings. It is therefore to be understood that within the scope of the appended claims the invention may be practiced otherwise than as specifically described.

What is claimed is:

1. A system for determining the direction to an acoustic signal source comprising, in combination:

first means for receiving the acoustic signal and for producing omnidirectional and directional output signals respectively indicative of the total amplitude and the amplitudes along two orthogonal vectors;

second means connected to receive one of said first means output signals for locking on a frequency above a predetermined signal-to-noise ratio and for producing an output error signal indicative of the deviations from said frequency;

third means connected to receive said deviation signal for detecting when it is within a preselected frequency range and above a predetermined amplitude and for producing an output enable signal indicative thereof;

fourth means connected to receive said first, second and third means output signals for producing omnidirectional and directional output signals indicative of said frequency; and fifth means connected to receive said fourth means output signals for producing an output signal indicative of the arc tangent of the ratio of the directional signals respectively referenced against the omnidirectional signal.

2. A system according to claim 1, further comprising:

said second means including a first bandpass filter formed to pass a predetermined range of frequencies and connected to receive said omnidirectional signal, a first tracking filter connected to receive the output signal from said bandpass filter, a clock signal and the enable signal for producing an output signal indicative of one frequency of the bandpass filter output signal, the one frequency being selected according to a predetermined ratio of the clock signal to the enable signal for passing the bandpass filter output signal in the absence of the enable signal, and phase lock loop means connected to receive the tracking filter output signal for producing the clock signal and the error signal.

3. A system according to claim 2, further comprising: said phase lock loop means including a hard limiter connected to receive said tracking filter output signal for producing an output signal respectively alternating between two limits according to the polarity of the tracking filter output signal, a phase detector connected to receive the hard limiter output signal and a counter signal for producing an output signal indicative of the phase difference therebetween, an integrator connected to receive the phase detector output signal for producing said deviation signal, a voltage controlled oscillator connected to receive the deviation signal and a sweep generator output signal for producing said clock signal of a frequency proportional to the sum thereof, a counter connected to receive the clock signal for producing said counter signal of a frequency determined by the frequency ratio of the bandpass of said first tracking filter relative the clock signal frequency, a phase shifter connected to receive the counter signal for producing an output signal in quadrature therewith, a second phase detector connected to receive the omnidirectional signal and the phase shifter signal for producing an output signal indicative of the phase difference therebetween and a signal-to-noise detector connected to receive the second phase detector signal for producing an output signal to a sweep generator for producing said sweep generator output signal when the second phase detector signal is below a predetermined amplitude.

4. A system according to claim 3, further comprising: said third means including a second bandpass filter connected to receive the deviation signal for producing an output signal indicative of a predetermined frequency bandpass thereof and amplitude sensitive means connected to receive the second bandpass filter signal for producing said enable signal when the amplitudes of the filter signal are above a predetermined level.

5. A system according to claim 4, further comprising: said fourth means including a second, third and fourth tracking filter connected to receive the clock and the enable signal and respectively connected to receive the omnidirectional and the corresponding ones of the directional output signals for producing output signals indicative of said one frequency thereof corresponding to the first tracking filter frequency ratio of the clock signal when the enable signal is on.

6. A system according to claim 5, further comprising: said fifth means including a second voltage controlled oscillator connected to receive the deviation signal for producing an output signal indicative of the sum of a fixed reference frequency and a frequency corresponding to the amplitude of the integrator signal, frequency converters each respectively connected to receive corresponding signals of said second, third and fourth tracking filters and the second oscillator signal for producing sideband signals indicative of the frequency sum and difference thereof and phase detector means connected to receive the respective sideband signals for producing the fifth means output signal.

7. A system according to claim 6, further comprising: said first means including an omnidirectional microphone disposed to align the sensitivity plane thereof substantially parallel to ground, two orthogonal directional microphones disposed to align the sensitivity axes thereof in a horizontal plane for respectively receiving acoustic signals radiated in a substantially horizontal plane and along the sensitivity axes thereof and for respectively producing said omnidirectional and directional output signals.

8. A system for determining the direction to a radiated signal source comprising, in combination:
omnidirectional sensing means for receiving the radiated signal and producing an output signal indicative thereof;
directional sensing means adjacently disposed to said omnidirectional sensing means for receiving the radiated signal resolved along two orthogonal vectors and for producing output signals indicative thereof;
phase lock means connected to receive the omnidirectional sensing means output signal for selecting a single frequency thereof exceeding a predetermined signal-to-noise ratio and for producing a deviation signal indicative of the fluctuations thereof;
detector means connected to receive the deviation signal for selectively producing an enable signal when the deviation signal is within a predetermined band of frequencies and above a predetermined amplitude; and
resolving means connected to receive the omnidirectional and directional sensing means output signals for producing an output signal indicative of the direction to the radiated signal source.

9. A system according to claim 8 wherein said phase lock means further comprises:
a bandpass filter connected to receive said omnidirectional sensing means output signal for producing an output signal indicative of a range of frequencies thereof;
phase detector means connected to receive said bandpass filter signal and a feedback signal for producing a first difference signal indicative of the phase difference therebetween and a second difference signal indicative of the phase difference between said bandpass filter signal and the quadrature of said feedback signal;
a first oscillator connected to receive said first and second difference signal at for producing said feedback signal a frequency corresponding to the sum thereof, and signal-to-noise detection means connected to receive said second difference signal for interrupting said signal when said signal exceeds a predetermined signal-to-noise ratio.

10. A system according to claim 9 wherein said resolving means further comprises:
narrow band tracking filters respectively connected to receive said omnidirectional and directional sensing means output signals and connected to receive said feedback signal and said enable signal for producing output signals of one frequency of said sensing means signals upon receiving said enable signal, said frequency corresponding to the frequency of said feedback signal;

a second oscillator connected to receive said deviation signal for producing an oscillator signal the frequency thereof corresponding to the sum of a fixed signal and said deviation signal;

frequency converter means connected to receive respective ones of said tracking filters output signals and said oscillator signal for producing sideband signals of a frequency equal to the frequency sum and the difference thereof; and a resolver connected to receive respective ones of said sideband signals for producing said output signal indicative of the phase difference therebetween.

* * * * *